United States Patent [19]

Abraham et al.

[11] Patent Number: 4,934,922

[45] Date of Patent: Jun. 19, 1990

[54] CATHODE-ACTIVE MATERIALS FOR SECONDARY BATTERIES

[75] Inventors: Kuzhikalail M. Abraham, Needham, Mass.; David M. Pasquariello, Pawtucket, R.I.

[73] Assignee: EIC Laboratories, Inc., Norwood, Mass.

[21] Appl. No.: 294,816

[22] Filed: Jan. 9, 1989

[51] Int. Cl.$^5$ .............................................. H01M 4/36
[52] U.S. Cl. ...................................... 429/194; 429/218
[58] Field of Search ................ 429/194, 197, 218, 199

[56] References Cited

U.S. PATENT DOCUMENTS

| | | | |
|---|---|---|---|
| 4,118,550 | 10/1978 | Koch | 429/194 |
| 4,237,204 | 12/1980 | Thompson et al. | 429/194 |
| 4,251,606 | 2/1981 | Haering et al. | 429/194 |
| 4,489,145 | 12/1984 | Abraham et al. | 429/197 |
| 4,587,182 | 5/1986 | Stiles et al. | 429/218 X |

Primary Examiner—Anthony Skapars
Attorney, Agent, or Firm—Fish & Richardson

[57] ABSTRACT

A secondary, rechargeable, battery comprising as a cathode-active material, a transition metal oxysulfide having the formula:

$$M^1_y M^2_{1-y} O_x S_{n-x}$$

wherein $M^1$ and $M^2$ are transition metals, y is higher than zero but not higher than 1, x is higher than zero and less than 1, and n is half the sum of the oxidation states of the transition metals $M^1$ and $M^2$, preferably molybdenum oxysulfide; an anode active material; and an electrolyte. Also disclosed is a method of making such a transition metal oxysulfide by mixing at least one transition metal oxide and at least one transition metal sulfide in aqueous ammonia, removing the ammonia and then decomposing the residue at elevated temperature under non-oxidizing conditions.

11 Claims, 1 Drawing Sheet

CATHODE-ACTIVE MATERIALS FOR SECONDARY BATTERIES

This invention was made with Government support under Contract DAAL01-87-C-0738 awarded by the U.S. Army. The Government has certain rights in this invention.

FIELD OF INVENTION

The present invention relates to cathode-active materials for electric current-producing cells and a method for makinq such cathode active compounds. Specifically, the invention discloses transition metal oxysulfides such as molybdenum monoxydisulfide ($MoOS_2$) and molybdenum dioxymonosulfide ($MoO_2S$) as cathode-active materials for secondary lithium batteries, and a convenient method for preparing these molybdenum oxysulfides.

PRIOR ART

A crucial component in a secondary lithium battery is the cathode active material. The cell capacity is determined by the extent to which the cathode-active material reacts with the lithium anode, and the cell voltage is determined by the free energy-change associated with the reaction. The energy output of the battery is given by the product of the capacity and the voltage. The cathode must satisfy a number of key requirements in order to be useful for the fabrication of high energy density, long cycle-life batteries. It should be insoluble in the electrolyte; it should exhibit a low equivalent weight, and show a high free-energy change for its reaction with the anode, such as lithium, to yield cells having high specific energies; and, the anode which reacts with the cathode-active material must be chemically reversible to afford long cycle-life for the battery. Solid-state transition metal chalcogenides, exemplified by $TiS_2$ (G. L. Holleck and J. R. Driscoll, Electrochem. Acta., 22, 644 (1977)) and transition metal oxides, typified by $V_6O_{13}$, (K. M. Abraham, J. L. Goldman and M. D. Dempsey, J. Electrochem. Soc., 128, 2493 (1981)) have been found to be useful as cathode-active materials for secondary lithium batteries. However, new cathode-active materials are highly desirable for the development of batteries whose capacity and voltage can be appropriately matched with ever increasing novel applications in electronics, communication devices, robotics and others.

SUMMARY OF THE INVENTION

The present invention discloses a class of cathode-active materials, whose electrochemical properties in lithium batteries had been previously unknown, namely transition metal oxysulfides, and specifically the molybdenum oxysulfides, $MoOS_2$ and $MoO_2S$. These materials have high capacity for their reaction with lithium and they are rechargeable. More than 100 discharge/charge cycles have been demonstrated with secondary lithium cells utilizing $MoOS_2$ and/or $MoO_2S$ as the cathode-active material.

The present invention, also discloses a convenient, and general method of making transition metal oxysulfides. In the case of molybdenum oxysulfides, the method consists of initially preparing a precursor for the oxysulfide from ammonium paramolybdate (or ammonium molybdate) and ammonium thiomolybdate, and subsequently decomposing the solid precursor at a temperature between 150 and 350° C. in an inert, for example, argon (Ar), atmosphere. The O:S ratio in the metal oxysulfide can be systematically varied, allowing the preparation of metal oxysulfide cathode-active materials of desired composition, by varying the amount of ammonium paramolybdate and ammonium thiomolybdate in the precursor. In the case of other transition metal oxysulfides, the decomposition temperature of the precursor can be determined from thermogravimetric experiments which relate weight loss of the precursor to temperature.

MORE SPECIFIC FEATURES OF THE INVENTION

In general, the invention features transition metal oxysulfides as cathode-active materials for secondary (rechargeable) lithium batteries.

Specifically, the invention relates to the use of $MoOS_2$ and $MoO_2S$ as cathode-active materials in a rechargeable lithium battery which contains:

(a) an anode having as its anode-active material (negative electrode) lithium or one or more other metals selected from Group IA, Group IB, Group IIA, and Group IIB metals of the Periodic Table;

(b) a cathode having as its cathode-active material $MoOS_2$ or $MoO_2S$ or mixtures thereof;

(c) an organic electrolyte, consisting of a solution of a lithium salt such as $LiAsF_6$, dissolved in an organic solvent, such as a mixture of tetrahydrofuran (THF) and 2-methyl-tetrahydrofuran (2Me-THF), which permits the migration of ions between said anode and said cathode.

The invention also features a convenient method of preparing the cathode-active materials $MoOS_2$ and $MoO_2S$. This method may be employed in a general way for the preparation of a variety of transition metal oxysulfides containing either single metal or mixed metals. The new synthetic method when applied to the synthesis of $MoOS_2$ can be represented by equations [1] and [2].

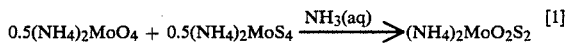

In this procedure a precursor is first prepared (equation [1]) which is subsequently decomposed (equation [2]). The potential application of the synthetic method for the preparation of novel materials may be illustrated as shown in equations [3] and [4] for a molybdenum-niobium oxysulfide, in equations [5] and [6] for a tungsten vanadium oxysulfide, and in equations [7] and [8] for a chromium molybdenum oxysulfide.

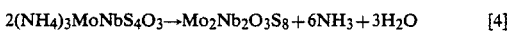

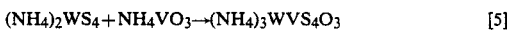

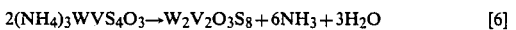

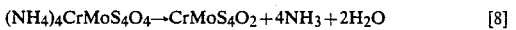

Figure 1:
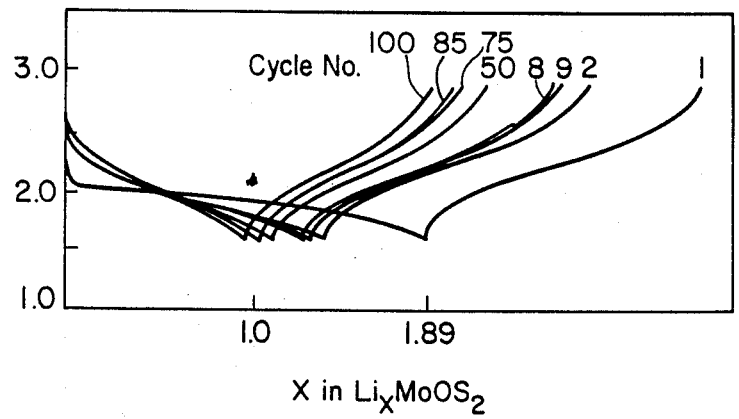
Fig. 1 is a diagrammatic representation of the cycle-life of a secondary lithium battery containing $MoOS_2$ as the cathode active material. It shows cycling curves for a lithium secondary cell containing molybdenum monoxydisulfide as the cathode-active material. In this drawing, the current density was $\pm 1.0$ mA/cm$^2$ for cycles 1, 2 and 8 and was $\pm 0.5$ mA/cm$^2$ for all other cycles.

The following embodiments further illustrate the general significance and advantages of this invention and enable those skilled in the art to understand and practice the invention.

As mentioned, the electric current-producing cell of the present invention is one which contains a suitable anode, a functional electrolyte, and a cathode having as its cathode-active material a transition metal oxysulfide, preferably $MoOS_2$ or $MoO_2S$.

In general, the anode employed in the cell of the present invention is one which contains as its anode-active material one or more metals selected from the group consisting of the Periodic Table Group IA metals, Group IB metals, Group IIA metals, and Group IIB metals. Of these, the Group IA metals, also known as the alkali metals, are desirable. Preferred is an anode having as its anode active material a metal selected from the group consisting of lithium and sodium, and most preferably lithium. The anode-active material may be in contact with other metal structures in the cell of the present invention, depending upon the particular anode-active material being used. Thus, for example, some anode-active materials are self-supporting and may also serve as current collectors whereas other anode-active materials, e.g., lithium, may be in contact with other metal structures, such as nickel, copper or silver screen, which serve as current collectors. These anode configurations are a matter of design depending upon the particular anode-active material being used and are well known in the art.

The cathode-active material employed in the cell of the present invention generally corresponds to the formula:

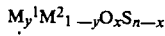

$$M_y^1 M^2{}_{1-y} O_x S_{n-x}$$

wherein $M^1$ and $M^2$ are the same or different transition metals of Groups IVB, VB, VIB, VIIB or VIIIB of the Periodic Table; y is a fractional positive number between zero and one; n is half the sum of the oxidation states of the transition metals $M^1$ and $M^2$ and x is a value greater than zero and less than n. This cathode-active material is preferably an oxysulfide of molybdenum, most preferably one corresponding to the formula:

$$MoO_x S_{3-x}$$

wherein x is greater than zero and less than 3.

The molybdenum oxysulfides are prepared by decomposing appropriate precursors. Thus, $MoOS_2$ is prepared by the decomposition of a precursor obtained by stirring an equimolar mixture of ammonium molybdate [$(NH_4)_2MoO_4$], or ammonium paramolybdate, and ammonium thiomolybdate [$(NH_4)_2MoS_4$] in aqueous $NH_3$. The ammonia is evaporated off the mixture after it has been stirred for a sufficient length of time, and the resulting residue, which is the precursor, is collected and decomposed at about 300° C., in an atmosphere of Ar, to give $MoOS_2$.

$MoOS_2$ can also be prepared by the decomposition of $(NH_4)_2MoO_2S_2$, obtained as an intermediate in the synthesis of $(NH_4)_2MoS_4$ by passing $H_2S$ through a solution of ammonium paramolybdate in aqueous $NH_3$. This synthesis, unless carefully carried out with considerable attention paid to purification, results in impure products since it is difficult to avoid small amounts of $(NH_4)_2MoS_4$ and $(NH_4)_2MoO_3S$ as contaminants in $(NH_4)_2MoO_2S_2$.

$MoO_2S$ can be prepared by the decomposition of a precursor obtained by mixing $(NH_4)_2MoO_4$ and $(NH_4)_2MoS_4$ in a 3:1 mole ratio in aqueous ammonia, and working up the precursor as above. The precursor is decomposed at about 300° C. in an Ar atmosphere to give $MoO_2S$.

Both $MoOS_2$ and $MoO_2S$ are amorphous oxysulfides as there were no sharp reflections apparent in their x-ray diffraction patterns.

The precursor method developed for synthesis of the molybdenum oxysulfides may be applied to the preparation of a variety of other transition metal oxysulfides as depicted in equations [3]–[8].

Advantageously, the cathode-active compounds of the present invention electrochemical cells may simply be cold pressed into a cathode structure. The cathode-active material may be supported on structures such as carbon, copper, nickel, stainless steel, iron, etc., and it may be supported on such materials or it may be impregnated into such materials. The cathode supported cathode material may contain a conductive diluent such as carbon, and a plastic binding agent, such as polyfluorethylene, may be used if desired.

The electrolyte used in the cell of the present invention is any electrolyte compatible with the anode and the cathode, and which permits the migration of ions between the anode and the cathode. In general, the choice of electrolyte depends upon the anode-active material being used in the cell. Thus, where the anode-active material is a Group IA metal, the electrolyte will most likely be nonaqueous. However, where the anode-active material is one which is selected, for example, from the Group IIB metals, an aqueous electrolyte may be employed. When the preferred anode-active material selected from the Group IA metals is used in a cell in the present invention, the electrolyte may typically be a nonaqueous alkali metal salt-organic solvent electrolyte solution. These alkali metal salts are well known in the art and may include, but are not limited to, $LiAsF_6$, $LiPF_6$, $LiSbF_6$, $LiBF_4$, $LiCF_3SO_3$, $LiAlCl_4$ and LiBr. However, such salts include the lithium and sodium salt complexes which are dissolved in organic solvents such as substituted and unsubstituted ethers, sulfones, organic sulfates, organic sulfites, organic carbonates, organic nitriles and organic nitro compounds. A preferred electrolyte for use in conjunction with cells containing lithium as its anode active material is an electrolyte containing lithium hexafluoro arsenate dissolved in 2-methyl-tetrahydrofuran (2-Me-THF) (U.S. Pat. No.

4,118,550) or in tetrahydrofuran (THF) containing 2-methyl-furan (2-Me-F) as an additive (U.S. Pat. No. 4,489,145) or in mixtures of THF and 2-Me-THF with 2-Me-F as an additive. A preferred electrolyte in cells containing sodium as its anode active material contains, as a preferred electrolyte, sodium iodide dissolved in 1,2-bis(2-methoxy-ethoxy) ethane. Alternatively, solid electrolytes such as the beta aluminas or halides, or molten salts, may be used.

The electric current-producing cells of the present invention containing the above-mentioned anodes, cathodes and electrolytes not only have high energy densities, but are also capable of being cycled through charging and discharging, and may be readily produced on a large-scale basis.

The present invention is illustrated by the following examples, but the invention should not be construed as being limited thereto.

EXAMPLE 1

$(NH_4)_2MoO_2S_2$ was precipitated from an ammoniacal aqueous solution of ammonium paramolybdate by bubbling $H_2S$ through it. The precipitate was collected by filtration, and dried under vacuum. The solid was heated under flowing Ar at about 300° C. for 3 hours to obtain $MoOS_2$. Its elemental analysis revealed the empirical formula $MoO_{1.1}S_{1.7}$, in satisfactory agreement with $MoOS_2$.

EXAMPLE 2

Equimolar amounts of molybdenum taken as ammonium paramolybdate $((NH_4)_6Mo_7O_{24}.4H_2O)$ and $(NH_4)_2MoS_4$ were combined in concentrated aqueous $NH_3$. The resulting solution was stirred at room temperature for six days. It was further refluxed for 4 hours. The solvent was subsequently evaporated off to leave the dark red solid precursor of $MoOS_2$. The precursor was decomposed in argon at about 300° C. for 3 hours to form $MoOS_2$. Its empirical formula from elemental analysis was found to be $MoO_{0.8}S_{2.1}$, in satisfactory agreement with formation of $MoOS_2$.

EXAMPLE 3

$(NH_4)_2MoO_3S$ was prepared from an aqueous ammoniacal solution of ammonium paramolybdate by bubbling $H_2S$ through it. A precipitate of $(NH_4)MoO_3S$ was collected from the reaction and it was dried under vacuum. The solid was heated at about 300° C. in Ar for 3 hours to obtain $MoO_2S$. Elemental analysis showed the empirical formula $MoO_{1.7}S_{0.95}$, in satisfactory agreement with $MoO_2S$.

EXAMPLE 4

$MoOS_2$ formed in Example 1 was treated with a large excess of n-butyl-lithium (n-BuLi) in hexane. The lithium uptake by $MoOS_2$ was calculated by determining the unreacted n-BuLi by titration against standard HCl. The amount of Li reacted with $MoOS_2$ was found to 3.41 moles per mole of $MoOS_2$.

EXAMPLE 5

$MoOS_2$ formed in example 2 was treated with n-BuLi as described in Example 4. The amount of Li reacted with this $MoOS_2$ was found to be 3.49 moles per mole of $MoOS_2$.

EXAMPLE 6

$MoO_2S$ formed in example 3 was treated with n-BuLi. The maximum Li uptake was found to be 3 moles of Li per mole of $MoO_2S$.

EXAMPLE 7

The $MoOS_2$ of Example 1 was mixed with 30 wt. % carbon and 10 wt. % polyfluoroethylene, and decane, and a paste thereof was prepared. A cathode was prepared by spreading this paste on an expanded nickel screen, pressing, then drying under vacuum to remove the decane. A cell was prepared by surrounding the cathode with polypropylene separators, then pure lithium metal which was also surrounded with polypropylene separators. The electrolyte was 1.5M $LiAsF_6$ in a blend of tetrahydrofuran, 2-methyl-tetrahydrofuran and 2-methyl-furan as described in U.S. Pat. No. 4,489,145 disposed between the anode and the cathode. This assembly was sealed in a nickel-plated D-size steel can which was hermetically sealed (welded). The cell exhibited an open circuit voltage of about 3.0V. It was discharged and charged between the voltage limits of 1.6 and 3.0V. The capacity in the first discharge, at 1 $mA/cm^2$, was 1.89 e/Mo. This, with a mid discharge voltage of 1.9V corresponds to a quasi theoretical specific energy for the $Li/MoOS_2$ cell of 515 Wh/Kg. The cell was repeatedly discharged and charged as shown in FIG. 1 to yield more than 100 cycles.

EXAMPLE 8

A lithium cell similar to that in Example 6 was constructed using the $MoOS_2$ prepared as in Example 2. Its first discharge at 0.5 $mA/cm^2$ gave a capacity of 2.06 e/$MoOS_2$. The mid-discharge voltage was 1.9V. The specific energy was 531 Wh/Kg. This cell was discharged and charged (cycled) more than 100 times.

EXAMPLE 9

Figure 2:
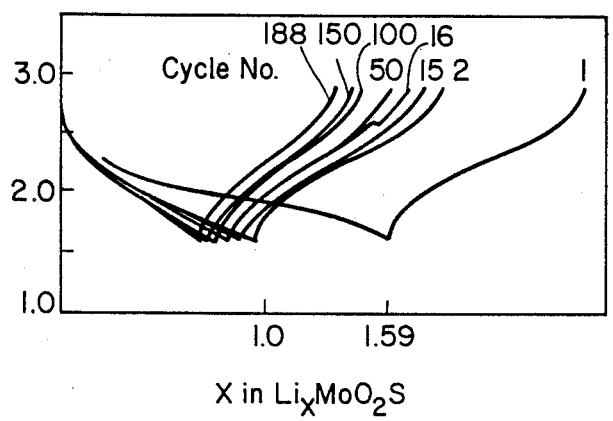
FIG. 2 is a diagrammatic representation of the cycle-life a secondary lithium battery containing $MoO_2S$ as the cathode active material. It shows cycling curves for a lithium secondary cell containing molybdenum dioxymonosulfide as the cathode active material. In this drawing, the current density was $\pm 1.0$ mA/cm$^2$ for cycles 1, 2 and 15 and was $\pm 0.5$ mA/cm$^2$ for all other cycles.

The $MoO_2S$ prepared as described in Example 3 was incorporated into a lithium cell as described in Example 6. It was first discharged at 1 $mA/cm^2$. The capacity was 1.59 e/Mo and the mid discharge voltage was 1.92V. The specific energy was 466 Wh/Kg. This cell was cycled as described in FIG. 2 to yield more than 100 cycles.

We claim:

1. A secondary electric current producing cell comprising an anode-active material comprising at least one member selected from the group consisting of Group IA, IB, IIA and IIB elements of the Periodic Table; a cathode-active material comprising at least one transition metal oxysulfide and an electrolyte, which facilitates the migration of ions between said anode and said cathode.

2. A cell as claimed in claim 1 wherein said anode-active material comprises an alkali metal.

3. A cell as claimed in claim 1 wherein said anode-active material is lithium.

4. A cell as claimed in claim 1 wherein said anode-active material is a Group IA metal and said electrolyte is non-aqueous.

5. A cell as claimed in claim 1 wherein said anode-active material is a Group IIB metal and said electrolyte is aqueous.

6. A cell as claimed in claim 1 wherein said electrolyte comprises at least one member selected from the group of lithium salts consisting of $LiAsF_6$, $LiPF_6$, $LiSbF_6$, $LiBF_4$, $LiCF_3SO_3$, $LiAlCl_4$ and LiBr.

7. A cell as claimed in claim 1 wherein said electrolyte comprises at least one member of the group of organic solvents consisting of ethers, sulfones organic sulfates, organic sulfites, organic nitriles, organic carbonates, and organic nitro compounds.

8. A cell as claimed in claim 1 wherein said anode-active material comprises lithium and said electrolyte comprises $LiAsF_6$ dissolved in a member selected form the group consisting of 2-methyl-tetrahydrofuran, a mixture of tetrahydrofuran and 2-methyl-tetrahydrofuran, a mixture of tetrahydrofuran and 2-methyl-furan, a mixture of 2-methyl-furan and 2-methyl-tetrahydrofuran, or a mixture of 2-methyl furan, 2-methyl-tetrahydrofuran and tetrahydrofuran.

9. A cell as claimed in claim 1 wherein said anode-active material comprises sodium and said electrolyte comprises sodium iodide dissolved in 1, 2-bis (2-methoxyethoxy) ethane.

10. A cell as claimed in claim 1 wherein said cathode-active material comprises molybdenum oxysulfide of the formula $$MoO_xS_{3-x}$$

where x is less than 3.

11. A cell as claimed in claim 1 wherein said cathode-active material has the empirical formula $$M^1_y M_{1-y}^2 O_x S_{n-x}$$

wherein
$M^1$ and $M^2$ are at least one transition metal selected from the groups consisting of Groups IVB, VB, VIB, VIIB and VIII of the Periodic Table, y is a fractional positive number greater than zero and not greater than 1, n is half the sum of the oxidation states of transition metals $M^1$ and $M^2$, and x has a value greater than zero and less than n.

* * * * *

UNITED STATES PATENT AND TRADEMARK OFFICE
CERTIFICATE OF CORRECTION

PATENT NO. : 4,934,922

DATED : June 19, 1990

INVENTOR(S) : Kuzhikalail M. Abraham et al.

It is certified that error appears in the above-identified patent and that said Letters Patent is hereby corrected as shown below:

TITLE PAGE:

In the ABSTRACT the formula on the fourth line should read: -- $M^1_y M^2_{1-y} O_x S_{n-x}$ --.

Column 6, line 1, "EXAMPLE 6" should appear centered above the line.

Column 8, line 10, the formula should read: -- $M^1_y M^2_{1-y} O_x S_{n-x}$ --.

Signed and Sealed this

Twenty-second Day of September, 1992

Attest:

DOUGLAS B. COMER

Attesting Officer        Acting Commissioner of Patents and Trademarks